United States Patent
Kobashi

(10) Patent No.: US 9,864,554 B2
(45) Date of Patent: Jan. 9, 2018

(54) INFORMATION PROCESSING APPARATUS AND DATA PROCESSING METHOD FOR INSERTING IMAGE INFORMATION INTO A DOCUMENT BY CONVERTING A SIZE OF THE IMAGE INFORMATION INTO A SIZE SUITABLE FOR AN OUTPUT PAPER SIZE OF THE DOCUMENT

(71) Applicant: CANON KABUSHIKI KAISHA, Tokyo (JP)

(72) Inventor: Kazufumi Kobashi, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 14/273,291

(22) Filed: May 8, 2014

(65) Prior Publication Data
US 2014/0333942 A1 Nov. 13, 2014

(30) Foreign Application Priority Data

May 9, 2013 (JP) .................................. 2013-099163

(51) Int. Cl.
*G06K 15/02* (2006.01)
*G06F 3/12* (2006.01)

(52) U.S. Cl.
CPC ............ *G06F 3/1208* (2013.01); *G06F 3/122* (2013.01); *G06F 3/1242* (2013.01); *G06F 3/1247* (2013.01); *G06F 3/1285* (2013.01)

(58) Field of Classification Search
None
See application file for complete search history.

(56) References Cited

U.S. PATENT DOCUMENTS

| | | | | | |
|---|---|---|---|---|---|
| 7,271,928 B2 * | 9/2007 | Naito | .................... | G06F 3/1208 358/1.15 |
| 2005/0105116 A1 * | 5/2005 | Kobashi | ....................... | 358/1.12 |
| 2007/0139704 A1 * | 6/2007 | Ogura | .................... | H04L 12/58 358/1.15 |
| 2008/0158599 A1 * | 7/2008 | Miwa | .................... | G06F 3/1205 358/1.15 |
| 2009/0244554 A1 * | 10/2009 | Yamanouchi | .................. | 358/1.2 |
| 2009/0273804 A1 * | 11/2009 | Kobashi | ............... | G06F 3/1205 358/1.15 |
| 2009/0310991 A1 * | 12/2009 | Isogai | ............................ | 399/45 |

(Continued)

FOREIGN PATENT DOCUMENTS

| JP | 6-115208 A | 4/1994 |
|---|---|---|
| JP | 2005-071187 A | 3/2005 |

(Continued)

*Primary Examiner* — Miya J Williams
(74) *Attorney, Agent, or Firm* — Canon USA, Inc. I.P. Division

(57) ABSTRACT

An information processing apparatus according to the present invention, when the information processing apparatus receives an insert instruction of image information, sets a size of an output paper used for outputting document information and decides whether the image information can be inserted. In a case where the information processing apparatus decides that the image information cannot be inserted, the information processing apparatus converts the image information into a size suitable for the set output paper size and inserts the converted image information into a document.

7 Claims, 15 Drawing Sheets

(56) References Cited

U.S. PATENT DOCUMENTS

2013/0055069 A1* 2/2013 Seo et al. .................. 715/234
2014/0153051 A1* 6/2014 Ma ..................... H04N 1/3872
                                                     358/1.18

FOREIGN PATENT DOCUMENTS

| JP | 2007-174069 A | 7/2007 |
| JP | 2010-067034 A | 3/2010 |
| JP | 2011-203826 A | 10/2011 |

* cited by examiner

FIG.7

```
<xml?>
 <Document DocumentName="Bind_Sample.bnd">~601
  <ChapterNumber>3</ChapterNumber>
  <PageNumber>10</PageNumber>
  <OutputPaper>Paper_A</OutputPaper>
  .................................
 </Document>
 <Chapters> ~602
  <Chapter>
   <ID>1</ID>
   <Name>Chapter1</Name>
   <IncludePages>1,2,3</IncludePages>
   .................................
  </Chapter>
  <Chapter>
   <ID>2</ID>
   <Name>Chapter2</Name>
   <IncludePages>4,5</IncludePages>
   .................................
  </Chapter>
  <Chapter>
   <ID>3</ID>
   <Name>Chapter3</Name>
   <IncludePages>6,7,8</IncludePages>
   .................................
  </Chapter>
   .................................
 <Chapters>
 <Pages>~604
  <Page>
   <ID>1</ID>
   .................................
  </Page>
  .................................
 </Pages>
</xml>
```

FIG.12

```xml
<xml?>
 <Document DocumentName="Bind_Sample.bnd">  ~601
  <ChapterNumber>3</ChapterNumber>
  <PageNumber>10</PageNumber>
  <OutputPaper>Paper_A</OutputPaper>
  ................................
 </Document>
 <Chapters>  ~602
  <Chapter>
   <ID>1</ID>
   <Name>Chapter1</Name>
   <IncludePages>1,2,3</IncludePages>
   ................................
  </Chapter>
  <Chapter>
   <ID>2</ID>
   <Name>Chapter2</Name>
   <IncludePages>4,5</IncludePages>
   <OutputPaper>Paper_B</OutputPaper>  ~1201
   ................................
  </Chapter>
  <Chapter>
   <ID>3</ID>
   <Name>Chapter3</Name>
   <IncludePages>6,7,8</IncludePages>
   ................................
  </Chapter>
   ................................
  <Chapters>
  <Pages>  ~604
   <Page>
    <ID>1</ID>
    ................................
   </Page>
   ................................
  </Pages>
</xml>
```

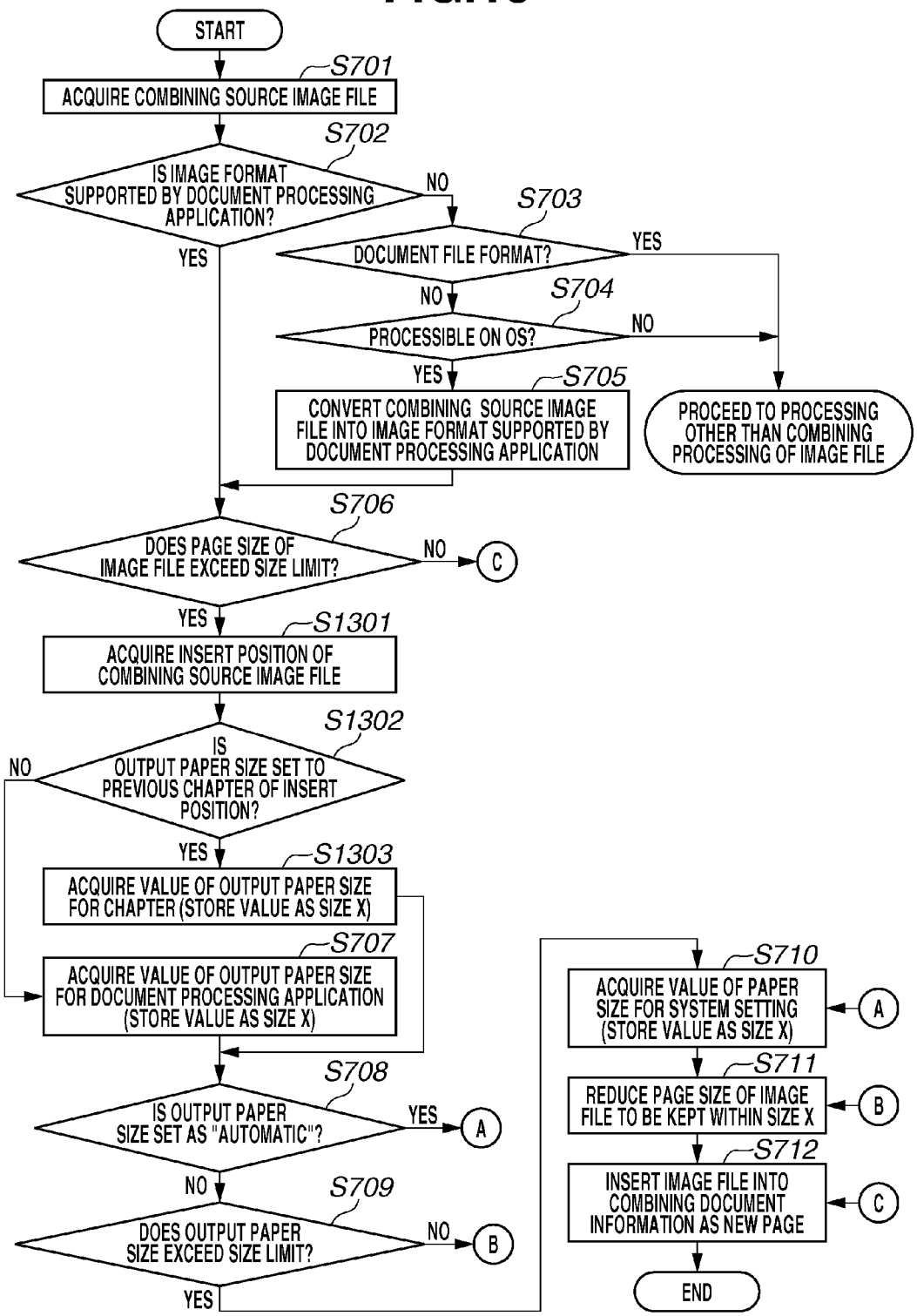

INFORMATION PROCESSING APPARATUS AND DATA PROCESSING METHOD FOR INSERTING IMAGE INFORMATION INTO A DOCUMENT BY CONVERTING A SIZE OF THE IMAGE INFORMATION INTO A SIZE SUITABLE FOR AN OUTPUT PAPER SIZE OF THE DOCUMENT

BACKGROUND OF THE INVENTION

Field of the Invention

The present invention relates to an information processing apparatus which converts a size of image information that is to be inserted into a document, a data processing method for the information processing apparatus, and a non-transitory computer-readable storage medium.

Description of the Related Art

When preview processing is executed on a document into which one or more image files are inserted without being reduced in size, a huge amount of memory capacity will be required for the processing if a size (the number of pixels or resolution) of the image file is large. Thus, it is problematic that the processing performance is lowered.

On the other hand, Japanese Patent Application Laid-Open No. 6-115208 discusses a printing technique for executing printing by selecting a suitable paper size based on the size of the image file. Accordingly, in the technique discussed in Japanese Patent Application Laid-Open No. 6-115208, printing is executed by selecting a large-size paper for a large-size image file, so that a large amount of memory capacity will be necessary for the processing. Thus, with the technique discussed in Japanese Patent Application Laid-Open No. 6-115208, the above-described problem cannot be solved.

SUMMARY OF THE INVENTION

The present invention is directed to an information processing apparatus capable of inserting image information into a document by converting a size of the image information into a size suitable for an output paper size of the document.

According to an aspect of the present invention, an information processing apparatus includes a memory and a processor in communication with the memory, such that the processor controls: a setting unit configured to set a size of an output paper used for outputting the document information, a reception unit configured to receive an insert instruction of image information, a decision unit configured to decide whether the image information can be inserted, and a conversion unit configured to execute conversion processing to the image information based on the set output paper size, in a case where the decision unit decides that the image information cannot be inserted, wherein a size of the image information after the conversion processing has been executed is smaller than a size of the image information before the conversion processing is executed.

Further features of the present invention will become apparent from the following description of exemplary embodiments (with reference to the attached drawings).

BRIEF DESCRIPTION OF THE DRAWINGS

FIG. 7 is a diagram illustrating details of document data.

FIG. 12 is a diagram illustrating details of the document data.

FIG. 13 is a flowchart illustrating a data processing method for the information processing apparatus.

DESCRIPTION OF THE EMBODIMENTS

Various exemplary embodiments, features, and aspects of the invention will be described in detail below with reference to the drawings.

Figure 1:
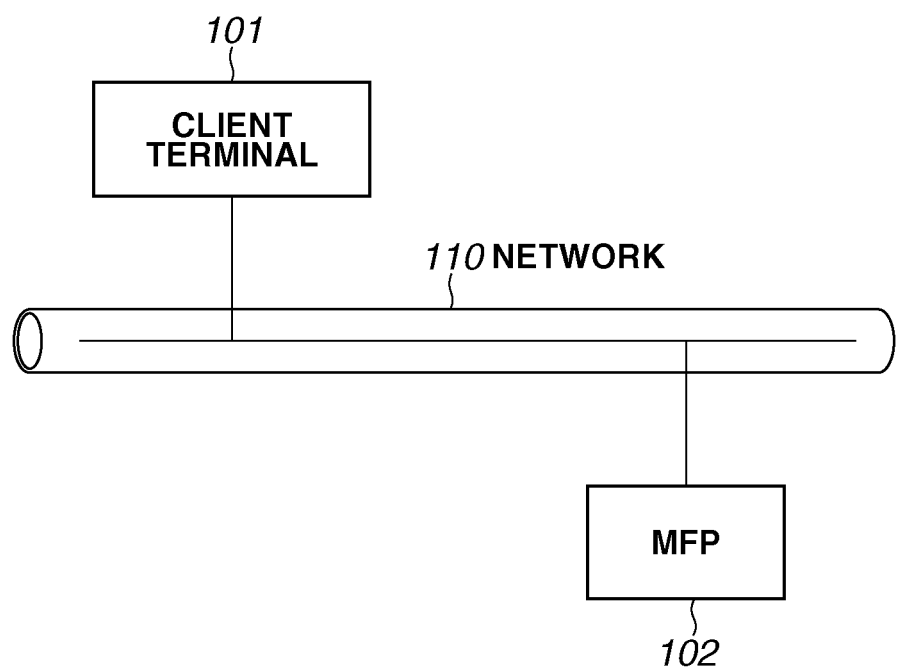
FIG. 1 is a diagram illustrating an information processing system including an information processing apparatus.

FIG. 1 is a diagram illustrating an information processing system including an information processing apparatus according to a first exemplary embodiment. FIG. 1 illustrates an example of a system in which the information processing apparatus and the image processing apparatus can communicate with each other via a network 110. A multifunction peripheral (MFP) which includes various functions, such as a printing function, a scanner function, and a facsimile function, is taken as an example of the image processing apparatus according to the present exemplary embodiment. The present exemplary embodiment is also applicable to a printer, such as a single function peripheral (SFP).

In FIG. 1, a client terminal 101 functioning as the information processing apparatus and an MFP 102 are connected to each other via the network 110. A plurality of the client terminals 101 may be connected thereto. The network 110 is a so-called communication network which can be realized by any or combination of the internet including a local area network (LAN), a wide area network (WAN), a telephone line, and a private digital line.

The network 110 can be either wired or wireless as long as data can be transmitted and received therethrough. Although a desktop personal computer, a laptop personal computer, a mobile-type personal computer, or a tablet-type terminal is employed as the client terminal 101. A smartphone provided with an execution environment of a program may be also employed as the client terminal 101. The client terminal 101 is provided with an environment for executing the program of, for example, an office application or a printer driver. The MFP 102 is connected to the network 110 and provided with a function for processing and outputting a print job transmitted from the client terminal 101.

Figure 2:
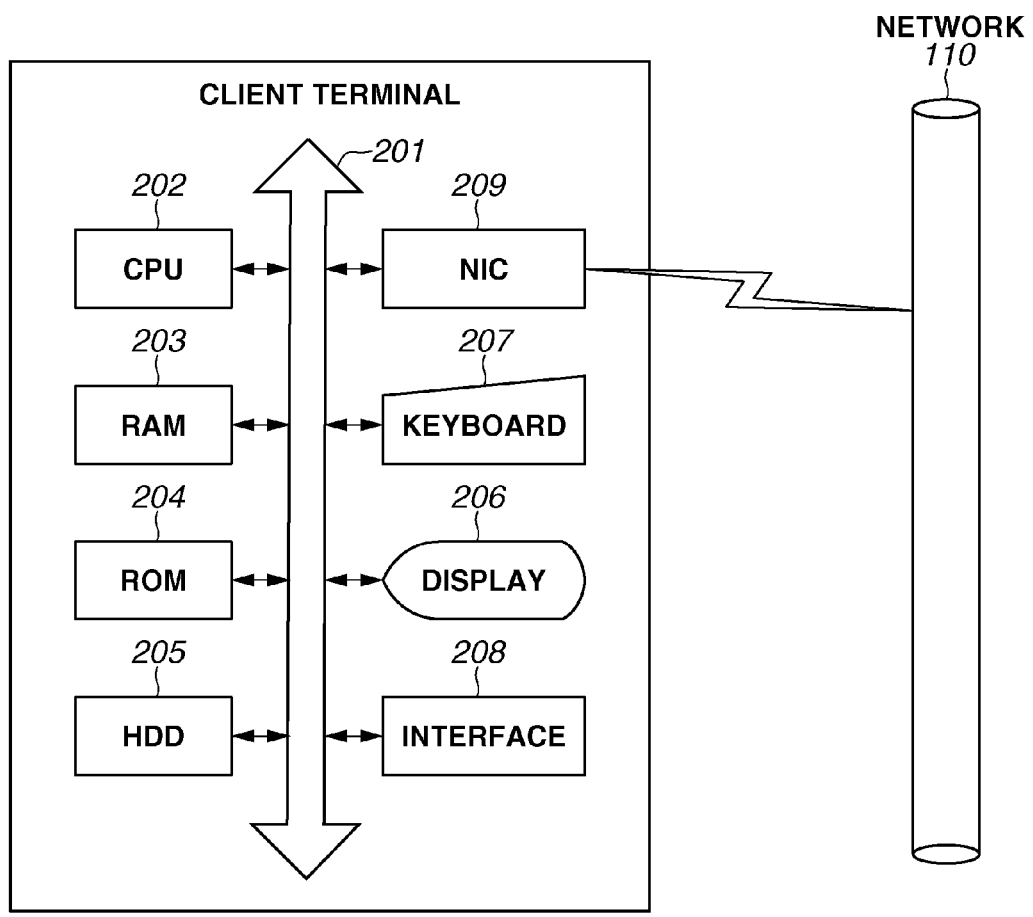
FIG. 2 is a block diagram illustrating a hardware configuration of a client terminal.

FIG. 2 is a block diagram illustrating a hardware configuration of the client terminal 101 illustrated in FIG. 1. In FIG. 2, the client terminal 101 which functions as an information processing apparatus for processing document information is illustrated as an example.

In FIG. 2, a central processing unit (CPU) 202 executes information processing by controlling the below-described units connected to a system bus 201. The CPU 202 executes an application program and an operating system (OS) stored in a hard disk drive (HDD) 205, and tentatively stores, in a random access memory (RAM) 203, information and files necessary to execute the programs.

A read only memory (ROM) 204 stores various kinds of data, such as a basic input-output (I/O) program. The RAM 203 serves as a temporary storage unit which functions as a main memory or a work area of the CPU 202.

The HDD 205 is a type of external storage unit which functions as a large-capacity memory and stores application programs of, for example, an office application and a Web browser, an operating system (OS), and relative programs. A display 206 serves as a display unit which displays a command input through a keyboard 207.

An interface 208 serves as an external device interface (I/F) to which a printer, a universal serial bus (USB) device, and a peripheral device are connected. The keyboard 207 serves as an instruction input unit. The system bus 201 is responsible for a flow of data within the client terminal 101. A network interface card (NIC) 209 exchanges data with an external device via the network 110. The above-described configuration of the client terminal 101 is merely an example, and the configuration thereof is not limited to that illustrated in FIG. 2. For example, depending on the characteristics of data or a program, a storage destination of the data and the program can be changed to the ROM 204, the RAM 203, or the HDD 205. Unless otherwise specified in the present exemplary embodiment, each of various kinds of the processing is executed by the CPU 202, and the data generated through the processing is read from and written into the ROM 204, the RAM 203, and the HDD 205.

Figure 3:
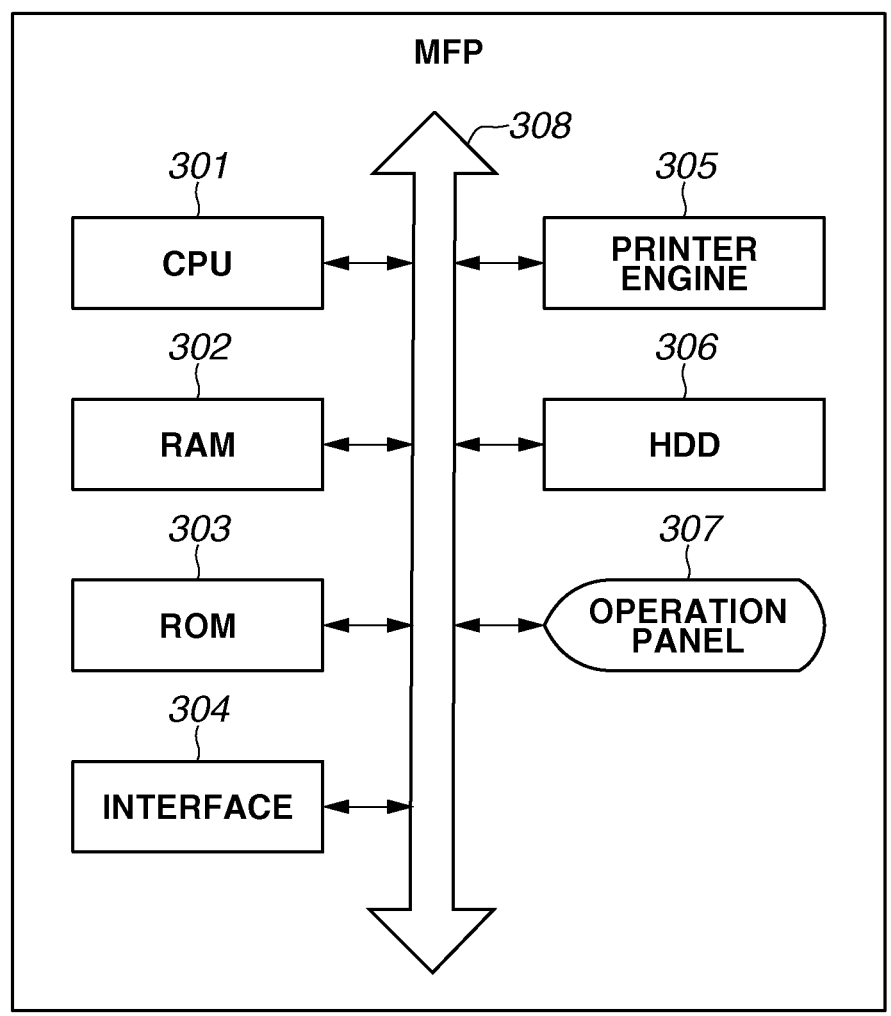
FIG. 3 is a block diagram illustrating a hardware configuration of a multifunction peripheral (MFP).

FIG. 3 is a block diagram illustrating a hardware configuration of the MFP 102 illustrated in FIG. 1. In FIG. 3, the MFP 102 includes a CPU 301, a RAM 302, a ROM 303, a communication interface 304, a printer engine 305, a hard disk drive 306, and an operation panel 307. These constituent elements of the MFP 102 are connected to each other via a system bus 308. The CPU 301 executes the software stored in the hard disk drive 306 by using the RAM 302 as a work memory.

Further, the CPU 301 sets an operation of the MFP 102 according to an instruction of a user input through the operation panel 307. In addition, the CPU 301 generates image data based on print data, such as page-description language (PDL) data, input from the external device via the communication interface 304, and executes printing by supplying the image data to the printer engine 305. A so-called basic input-output system (BIOS) for controlling the input and output of data to the hard disk drive 306 is stored in the ROM 303.

Figure 4:
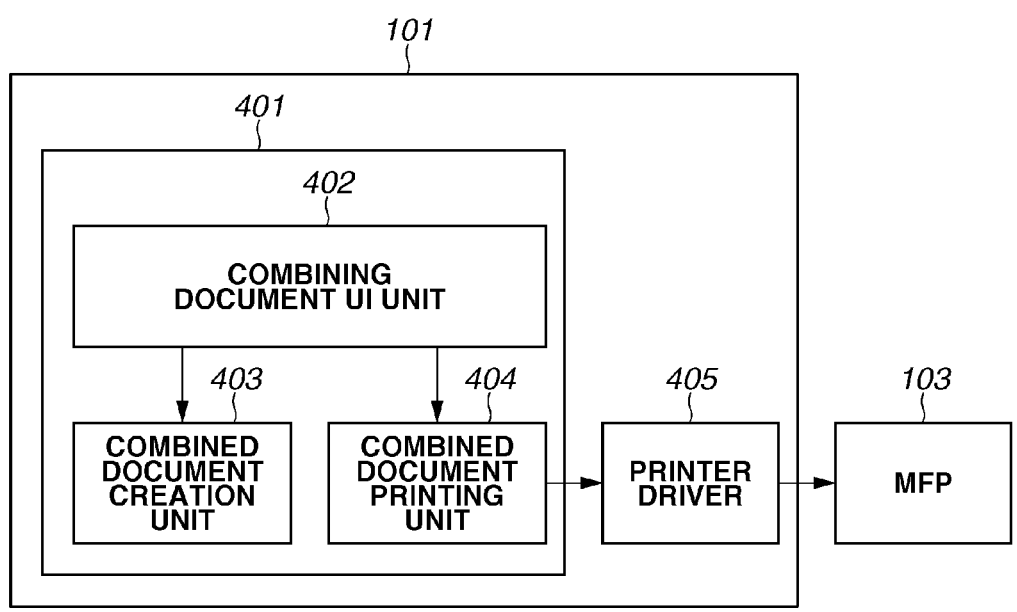
FIG. 4 is a block diagram illustrating a software configuration of the client terminal.

FIG. 4 is a block diagram illustrating a software configuration of the client terminal 101 illustrated in FIG. 1. The client terminal 101 includes a document processing application 401. The document processing application 401 includes a user interface for executing various kinds of processing described in the present invention, and manages the execution of various functions by receiving a request from the user. Each of unit 402 through 404 is a constituent element which configures the document processing application 401.

Figure 5:
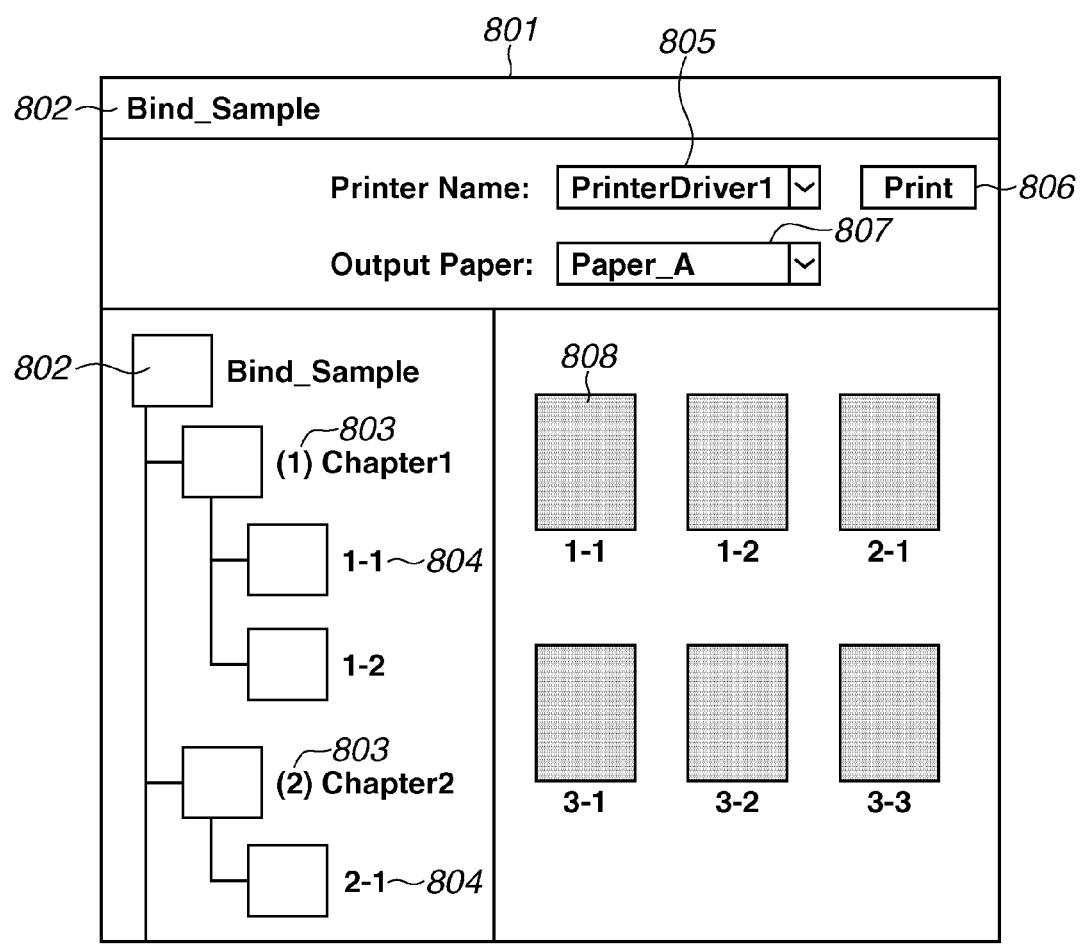
FIG. 5 is a diagram illustrating an example of a user interface (UI) screen of a document processing application.

A combining document UI unit 402 receives various inputs operated by the user and executes processing, such as display processing of a user interface (UI) illustrated in FIG. 5. A combined document creation unit 403 creates a combined document by receiving and inserting a combining source document file (combining source document) into a combining document. A combined document printing unit 404 executes processing for transmitting the combined document to a printer driver 405. The printer driver 405 is installed in the HDD 205 and transmits a print job to an MFP 103 that is communicable. The document processing application 401 transmits main text data of the combining document to the printer driver 405 from the combining document UI unit 402.

FIG. 5 is a diagram illustrating an example of a UI screen of the document processing application 401 executed by the client terminal 101 illustrated in FIG. 1. The document processing application 401 displays the UI screen by receiving an instruction for opening or newly creating the combined document.

The UI screen includes a window 801. A document name 802, a chapter 803, and a page 804 of the combined document are displayed on the window 801. The document name 802, the chapter 803, and the page 804 correspond to a document structure illustrated in FIG. 6. A printer driver selection control 805 is also displayed on the window 801. A list of printer drivers installed in the HDD 205 is displayed on the printer driver selection control 805 as options, so that the printer which executes printing is determined according to an instruction from the user. A print button 806 is displayed on the window 801. When the print button 806 is pressed by the user, the main text data of the combining document is transferred to the printer driver specified by the printer driver selection control 805, so that the print job will be generated thereby. An output paper size selection control 807 is displayed on the window 801. The output paper size selection control 807 displays a list of usable paper sizes which is acquired from the printer driver specified by the printer driver selection control 805, so that an output paper size is determined according to an instruction from the user. Thumbnails 808 of the combined document are displayed on the window 801. Each of the thumbnails 808 is displayed in a state that the output paper size specified by the output paper size selection control 807 is reflected.

Figure 6:
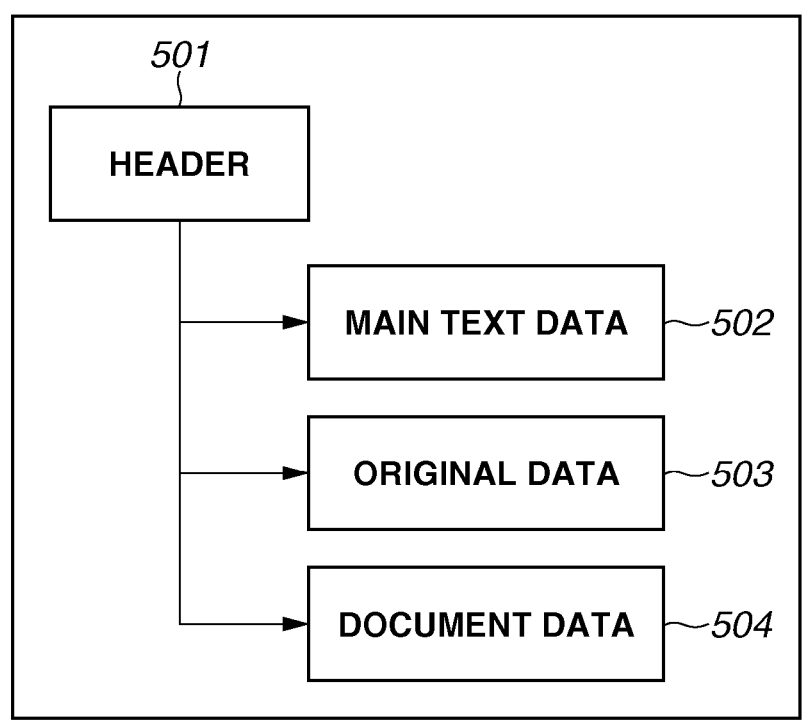
FIG. 6 is a diagram illustrating a data structure of a combined document processed by the client terminal.

FIG. 6 is a diagram illustrating a data structure of the combined document processed by the client terminal 101 illustrated in FIG. 1. In the present exemplary embodiment, document information having a structured hierarchy will be described as an example. In FIG. 6, below-described data is managed by being associated with a header 501. A plurality of document files, such as a word file and a portable document format (PDF) file, is combined with each other to generate main text data 502 of the combined document. Original data 503 is a creation source document file of the combined document. Therefore, the original data 503 may be configured of a plurality of documents. Document data 504 manages information of a document, a chapter, a page of the main text data 502, and attribute information of the chapter.

FIG. 7 is a diagram illustrating details of document data illustrated in FIG. 6. In the present exemplary embodiment, document data in an extensible markup language (XML) format will be described as an example. However, the format thereof may be other data format defined by other structure. In FIG. 7, the main text data 502 of the combined document is configured of a document 601, a chapter 602, and a page 604. The document 601 represents an entire portion of the main text data 502. The page 604 corresponds to one page worth of the main text data 502. The chapter 602 includes one or more pages 604, whereas the document 601 includes one or more chapters 602. Further, a chapter attribute <IncludePages> represents an identification (ID) of the page 604 which belongs to that chapter 602.

Figure 8:
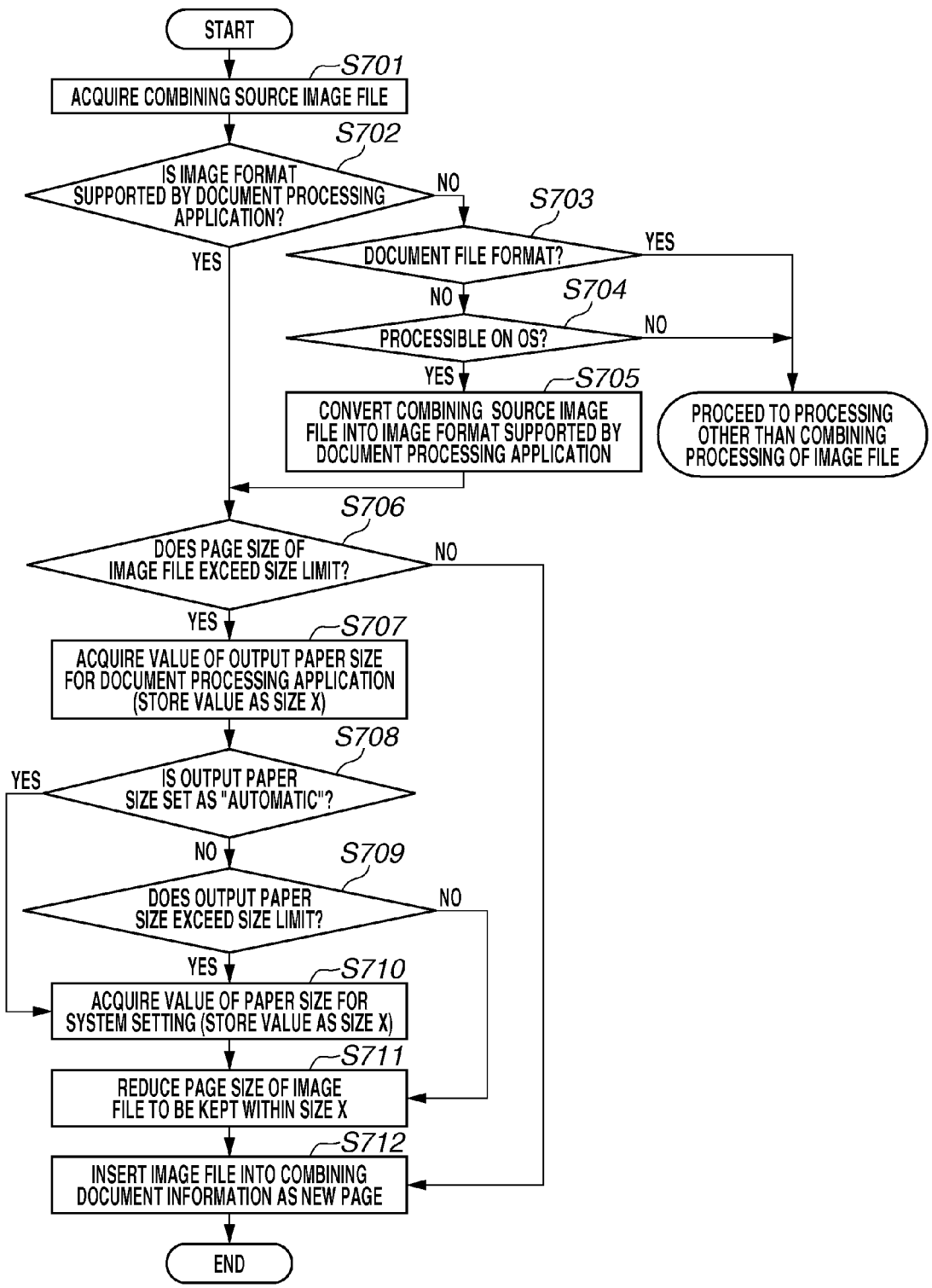
FIG. 8 is a flowchart illustrating a data processing method for the information processing apparatus.

FIG. 8 is a flowchart illustrating a data processing method for the information processing apparatus according to the present exemplary embodiment. Processing for inserting the image file into the combined document will be described as an example. Hereinafter, each processing process will be described with reference to the UI screen illustrated in FIG. 5 and the UI screen of the document processing application 401 illustrated in FIG. 9. In addition, each step of the flowchart according to the present exemplary embodiment will be realized by the CPU 202 illustrated in FIG. 2 executing the document processing application 401 stored in the HDD 205. Description will be given to the processing to be executed by each module illustrated in FIG. 4 when the CPU 202 executes the document processing application 401 installed in the client terminal 101. The processing will be started when the document processing application 401 receives an insert instruction (import instruction) of image information (image file) from the user.

In step S701, the document processing application 401 acquires a combining source document file (i.e., document file that is to be combined with a combining document, which is also referred to as "combining source file"). Specifically, the document processing application 401 acquires the combining source document file by receiving the insert instruction of the document file from the user. The processing for acquiring the combining source document file has processing patterns, such as a pattern in which a new combined document is created from the combining source document (hereinafter, "new document creation pattern") and a pattern in which the combining source document is added to a combined document created previously (hereinafter, "addition pattern"). An example of the new document creation pattern is a processing pattern in which the user executes the document processing application 401 by selecting a document file through a file system of the OS. For example, in a case where the combining source document is dragged and dropped into the UI of the document processing application 401 activated as a new document creation mode, the document processing application 401 acquires the combining source document as the document for the new document creation pattern. In other words, this drag-and-drop instruction corresponds to the insert instruction.

On the other hand, an example of the addition pattern is a processing pattern in which the user specifies the combining source document by specifying a document file addition menu from the UI of the document processing application 401. For example, in a case where the combining source document is dragged and dropped into the UI of the document processing application 401 activated as an addition mode, the document processing application 401 acquires the combining source document as the document for the addition pattern. In the new document creation pattern, in response to a new document creation instruction, the document processing application 401 provides the combined document creation unit 403 with a file path of the combining source document received from the OS. In the addition pattern, in response to an addition instruction from the user, the combining document UI unit 402 provides the combined document creation unit 403 with a file path of the combining source document. Unless otherwise specified, subsequent processing will be executed by the combined document creation unit 403.

In step S702, the combined document creation unit 403 decides whether a format of the combining source document file acquired in step S701 is an image format supported by the document processing application 401. In a case where the document processing application 401 uniquely defines the image format that can be displayed and edited thereby, in step S702, the combined document creation unit 403 decides whether the format is a supported image format by acquiring a file extension from the file path acquired in step S701. For example, in a case where the document processing application 401 supports a tag image file format (TIFF), and if the document file has an extension of either ".tif" or ".tiff" the combined document creation unit 403 decides that the format thereof is the supported image format (YES in step S702), and the processing proceeds to step S706. If the format is not the supported image format (NO in step S702), the processing proceeds to step S703. In step S703, the combined document creation unit 403 decides whether the combining source file acquired in step S701 is in a document file format. In a case where the document processing application 401 uniquely defines the format of the document file to be combined through the combining processing, in step S703, the combined document creation unit 403 acquires a file extension from the file path acquired in step S701 and decides whether the combining source file is in a document file format supported thereby.

For example, in a case where processing in which a Microsoft Word (registered trademark) format file is combined as a document file is defined, the acquired combining source file is decided to be the document file if the extension thereof is either ".doc" or ".docx". If the combining source file is decided to be the document file (YES in step S703), the combined document creation unit 403 decides that the combining source file acquired in step S701 is not an image file, so that the processing of the flowchart illustrated in FIG. 8 is finished. On the other hand, if the combined document creation unit 403 decides that the combining source file is not in the document file format supported by the document processing application 401 (NO in step S703), the processing proceeds to step S704. In step S704, the combined document creation unit 403 decides whether the combining source file acquired in step S701 is the image file processible on the OS.

The combined document creation unit 403 refers to a list of extensions, which is acquired from the OS, readable by the image codec installed in the OS. Then, if the file extension acquired in step S701 is included in the list, the combined document creation unit 403 decides that the combining source file is a processible image file (YES in step S704), and the processing proceeds to step S705.

On the other hand, in a case where the combined document creation unit 403 decides that the combining source file is not a processible image file, the combined document creation unit 403 decides that the combining source file acquired in step S701 is not an image file (NO in step S704), and the processing of the flowchart is finished.

In step S705, the combined document creation unit 403 converts the combining source image file which has been decided to be a processible image file in step S704 into the image format supported by the document processing application 401. Specifically, the combining source image file is drawn and converted into the supported image format, such as a TIFF format, by the image processing function of the OS. If the document processing application 401 does not uniquely define the processible extensions, the processing in steps S702, S703, and S705 can be omitted. In step S706, the combined document creation unit 403 calculates a page size of the combining source image file and decides whether the page size exceeds a size limit of the page processible by the document processing application 401. The size limit may be either a specified condition of the output paper size set to the document processing application 401 or a specified condition of the output paper size set to the system setting. Accordingly, the above specified condition will be decided based on either the output paper size specified by the document processing application 401 or the output paper size specified by the system, details of which will be described below. In a case where decision is performed based on the output paper size of the system, the output paper size acquired from the system setting which is different from the output paper size specified by the document processing application 401 will be automatically set thereto.

Specifically, the combined document creation unit 403 calculates the page size of the image file from the resolution and the number of pixels described on the image file header. For example, if the resolution and the number of pixels are 96 dpi and 1800 pixels respectively, the page size will be 18.75 inches. In a case where the resolution is not defined in the image file header, the processing is executed by applying a fixed value of the document processing application 401, such as 96 dpi. When the processible page size of the document processing application 401 is set up to 19 inches and if the page size of the image file exceeds 19 inches, the combined document creation unit 403 decides that the page size exceeds the limit value (YES in step S706), and the processing proceeds to step S707.

If the combined document creation unit 403 decides that the page size of the image file does not exceed 19 inches (NO in step S706), the processing proceeds to step S712.

On the other hand, in a case where the combined document creation unit 403 decides that the page size exceeds the size limit of the document processing application 401 in step S706, in step S707, the combined document creation unit 403 acquires a setting value of the output paper size of the document processing application 401. The combined document printing unit 404 acquires the values of the output paper size (i.e., name, width, and height) specified by the above-described output paper size selection control 807, and provides these values to the combined document creation unit 403. The combined document creation unit 403 temporarily stores the acquired values of the output paper size in a memory as "size X". In step S708, the combined document creation unit 403 decides whether the name of the output paper size acquired in step S707 is "automatic".

The output paper size "automatic" represents a setting value for automatically determining a suitable paper size according to the page size of the combined document. In a case where the document processing application 401 does not provide the output paper size "automatic" as an option, the above processing step can be omitted. In a case where the combined document creation unit 403 decides that the name of the output paper size acquired in step S707 is "automatic" (YES in step S708), the processing proceeds to step S710.

In step S709, the combined document creation unit 403 decides whether the width or the height of the output paper size acquired from the combined document printing unit 404 in step S707 exceeds the size limit processible by the document processing application 401. In a case where the page size processible by the document processing application 401 is 19 inches, and if the width or the height of the output paper size acquired in step S707 exceeds 19 inches, the combined document creation unit 403 decides that the output paper size exceeds the limit value (YES in step S709) and the processing proceeds to step S710.

On the other hand, in a case where the combined document creation unit 403 decides that the width and the height of the output paper size acquired in step S707 are equal to or less than 19 inches (NO in step S709), the processing proceeds to step S711. In step S710, the combined document creation unit 403 acquires a setting value of the paper size set by the system setting of the document processing application 401.

Figure 9:
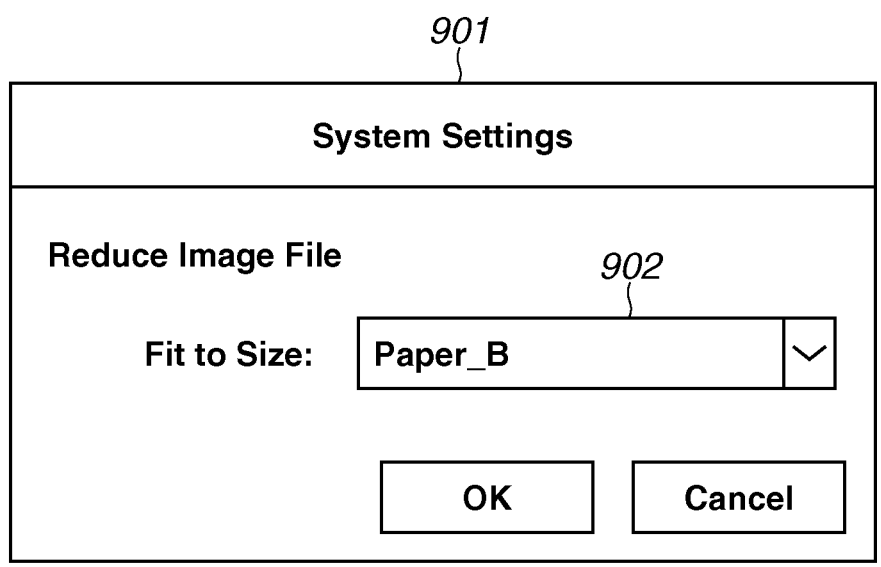
FIG. 9 is a diagram illustrating an example of a system setting UI of the document processing application.

FIG. 9 is a diagram illustrating an example of a system setting UI of the document processing application 401. In the present exemplary embodiment, the system setting UI is displayed by being read from a system setting menu of the document processing application 401. In FIG. 9, a setting control 902 for specifying the paper size is displayed on a system setting screen 901. The paper size specified by the setting control 902 will be used when the output paper size is set to "automatic", or the output paper size exceeds the size limit processible by the document processing application 401. Therefore, it is desirable for the user to set the paper size through the UI screen illustrated in FIG. 9 before the processing illustrated in FIG. 8 is executed.

The combined document creation unit 403 changes the value of the output paper size acquired in step S707 into a value of the paper size of the system setting, and temporarily stores that value in the memory as "size X". In step S711, the size of the image file is reduced so that the image inscribes in the region of the size X stored in step S707 or S710. The reduction processing of the image file is executed by thinning out the horizontal and the vertical pixel numbers to make the size thereof be kept within the size X without changing the aspect ratio. Further, the reduction processing is executed while making the orientation (i.e., portrait or landscape orientation) of the image file and the size X conform to each other. For example, in a case where the image file has a landscape orientation in the length and the breadth of 2000 pixels and 3000 pixels, respectively. Then, the size X having the width and the height of 8.5 inches and 11 inches, respectively, is assumed to be a landscape orientation in the length and the breadth of 11 inches and 8.5 inches, respectively. Then, the image file is reduced such that the image inscribes in the region of the size X accordingly.

In step S712, the image file is inserted into the combining document information. The combined document creation unit 403 inserts either the image file that has a size within the processible range of the document processing application 401, or the image file that is reduced by the reduction processing in step S711 into the combining document information as a new page, and the processing ends.

According to the present exemplary embodiment, the size of the image file after the conversion processing (reduction processing) of step S711 has been executed is smaller than the size of the image file before the conversion processing (reduction processing) of step S711 is executed. The "size" may be regarded and construed as either an area in which the image file is output at the equivalent resolution, or a data size of the image file. Accordingly, the image file which exceeds the processible page size of the document processing application 401 can be inserted into the combining document by reducing the size in accordance with the paper size used by the document processing application 401 in a printing period. Furthermore, because the large-size image file that may lower the processing performance of the document processing application 401 is inserted by reducing the size in accordance with the paper size used in the printing period or the paper size specified by the system setting, it is possible to suppress a negative effect of the large-size image file on the processing performance.

That is, according to the present exemplary embodiment, the image information can be inserted into the document information by converting the image information into a size suitable for the output paper size of the document information.

Hereinbelow, a second exemplary embodiment will be described in detail while clearly describing the difference between the first exemplary embodiment and the present exemplary embodiment. In the present exemplary embodiment, the output paper size can be set in a chapter unit of the document processing application 401, so that processing for reducing and conforming the image file to the output paper size for the chapter is executed according to the insert position of the combining source document.

Figure 10:
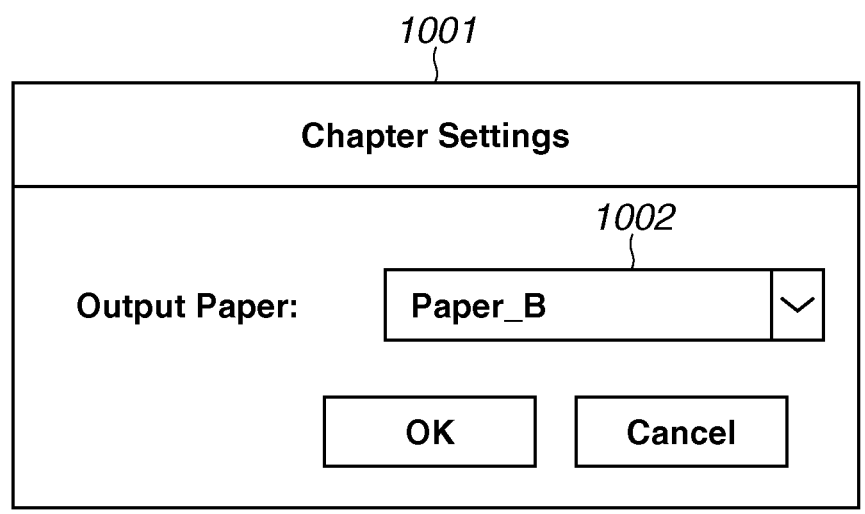
FIG. 10 is a diagram illustrating an example of a UI screen displayed on the client terminal.
Figure 11:
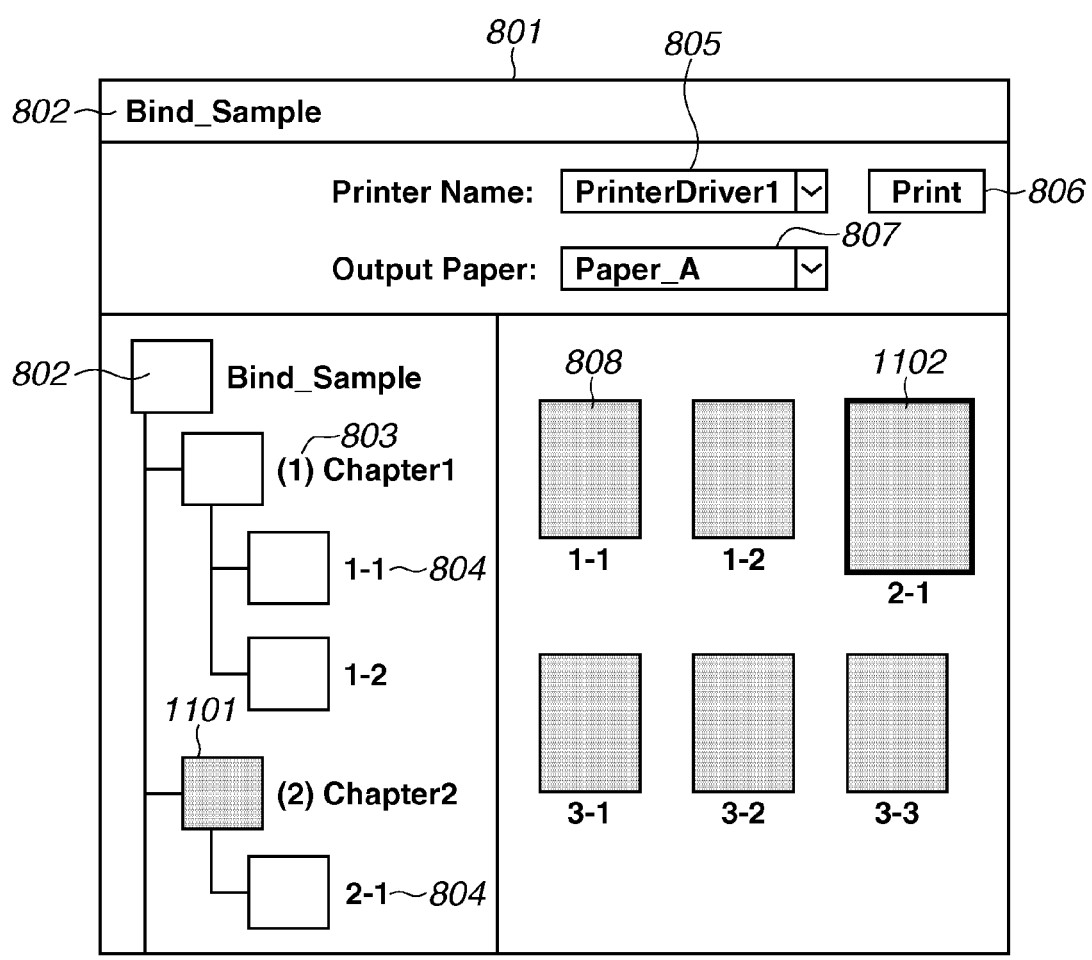
FIG. 11 is a diagram illustrating an example of a UI screen displayed on the client terminal.

FIGS. 10 and 11 are diagrams each illustrating an example of the UI screen displayed on the client terminal 101 illustrated in FIG. 1. FIGS. 10 and 11 illustrates the examples of the UI screens of the document processing application 401 which allow the user to set the output paper size in a chapter unit. In particular, FIG. 10 corresponds to a setting screen of the output paper size for the chapter which is displayed through an edit menu of the document processing application 401. In FIG. 10, a chapter setting screen 1001 includes a selection control 1002 of an output paper size for the chapter. Options for the output paper size can be the same as those for the output paper size of the entire document.

FIG. 11 corresponds to the UI screen of the document processing application 401 in which the output paper size for the chapter is set thereto. In FIG. 11, an icon 1101 is a display example indicating a state where the output paper size for the chapter is set to Chapter 2. The icon which enables the user to recognize that a setting different from that for the entire document is set thereto is displayed. A thumbnail 1102 indicates a state where display of the thumbnail has been changed according to the output paper size set to Chapter 2.

FIG. 12 is a diagram illustrating a structure of the document data processed by the client terminal 101 illustrated in FIG. 1. In FIG. 12, a setting for the output paper size for the chapter is added to the document data of the combining document illustrated in FIG. 7. In FIG. 12, a tag 1201 illustrates a state where an output paper size "Paper_B" is set to the second chapter.

FIG. 13 is a flowchart illustrating a data processing method of the information processing apparatus according to the present exemplary embodiment. Processing for inserting the image file into the combining document while taking the output paper size for the chapter into consideration will be described as an example. Hereinafter, processing steps different from those illustrated in FIG. 8 will be described.

In step S1301, the combined document creation unit 403 acquires an insert position of the combining source file. The document processing application 401 can insert the combining source file into a position between the chapters, and the insert position can be specified by the user. When the user selects the combining source file, the user may also specify the insert position by executing a document file addition menu through the UI of the document processing application 401.

In step S1302, the combined document creation unit 403 determines whether the output paper size is set to the chapter specified by the insert position of the combining source file acquired in step S1301. Specifically, in a case where the combining source file is placed within the existing chapter, the combined document creation unit 403 determines whether the output paper size is set to that existing chapter. On the other hand, in a case where the combining source file is placed in a position other than the existing chapter, the combined document creation unit 403 determines whether the output paper size is set to the previous chapter of the insert position. In the example illustrated in FIG. 12, if the insert position is the third chapter (i.e., combining source file is placed in a position different from the existing chapter), the combined document creation unit 403 determines that the output paper size is set thereto (YES in step S1302) because the output paper size (tag <OutputPaper>) is set to the second chapter, and the processing proceeds to step S1303. In a case where the output paper size is not set thereto (NO in step S1302), the processing proceeds to step S707. In step S1303, the combined document creation unit 403 acquires a value of the output paper size for the chapter. In the example illustrated in FIG. 12, the combined document creation unit 403 provides the output paper size "Paper_B" for the second chapter to the combined document printing unit 404 to acquire the sizes, such as the width and the height, and temporarily stores these sizes in the memory as "size X". Thereafter, the processing proceeds to step S708.

According to the present exemplary embodiment, reduction processing of the image file can be executed while the output paper size for the chapter is taken into consideration. For example, in FIG. 11, because the image file represented by the thumbnail 1102 is reduced to a size larger than the reduced size of the entire documents, deterioration of the image can be suppressed as much as possible.

Figure 14:
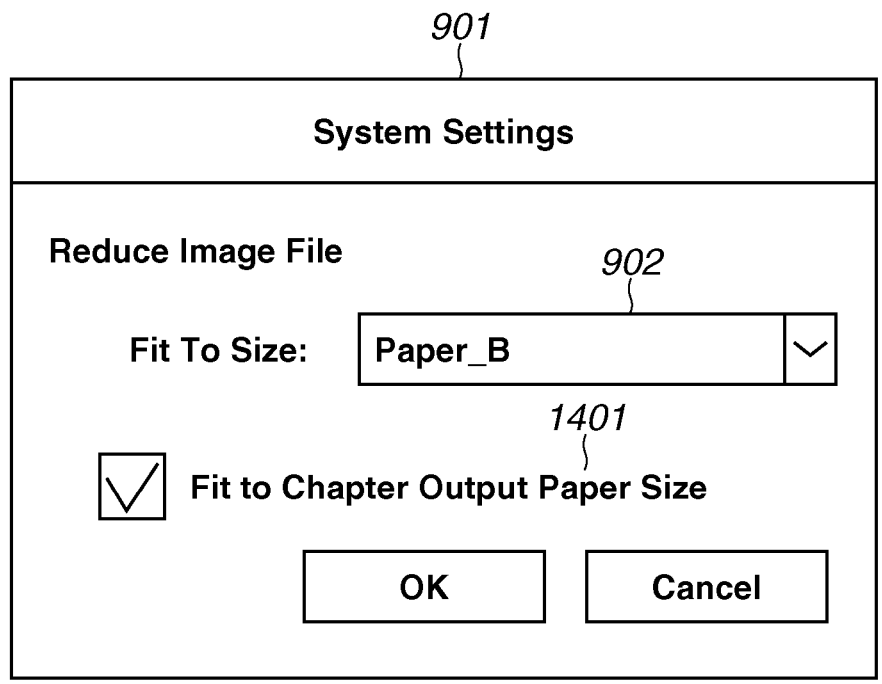
FIG. 14 is a diagram illustrating an example of a UI screen displayed on the client terminal.

FIG. 14 is a diagram illustrating an example of the UI screen displayed on the client terminal 101 illustrated in FIG. 1. FIG. 14 illustrates an example of a system setting UI screen of the document processing application 401. In FIG. 14, the user can specify whether to reduce the image file according to the output paper size for the chapter through a checkbox 1401. By checking or unchecking the checkbox 1401, the user may switch as to whether to execute the reduction processing of the image file which takes the print setting of the chapter into consideration, as illustrated in the flowchart of FIG. 13.

Hereinbelow, a preferred embodiment for realizing the third exemplary embodiment of the present invention will be described with reference to FIG. 15. Description will be only given to the differences between the first and the present exemplary embodiments.

In a case where the output paper size is not specified by displaying the UI screen illustrated in FIG. 5 when the combined document is created by the document processing application 401, reduction processing of the image file is executed according to the paper size of the system setting.

Figure 15:
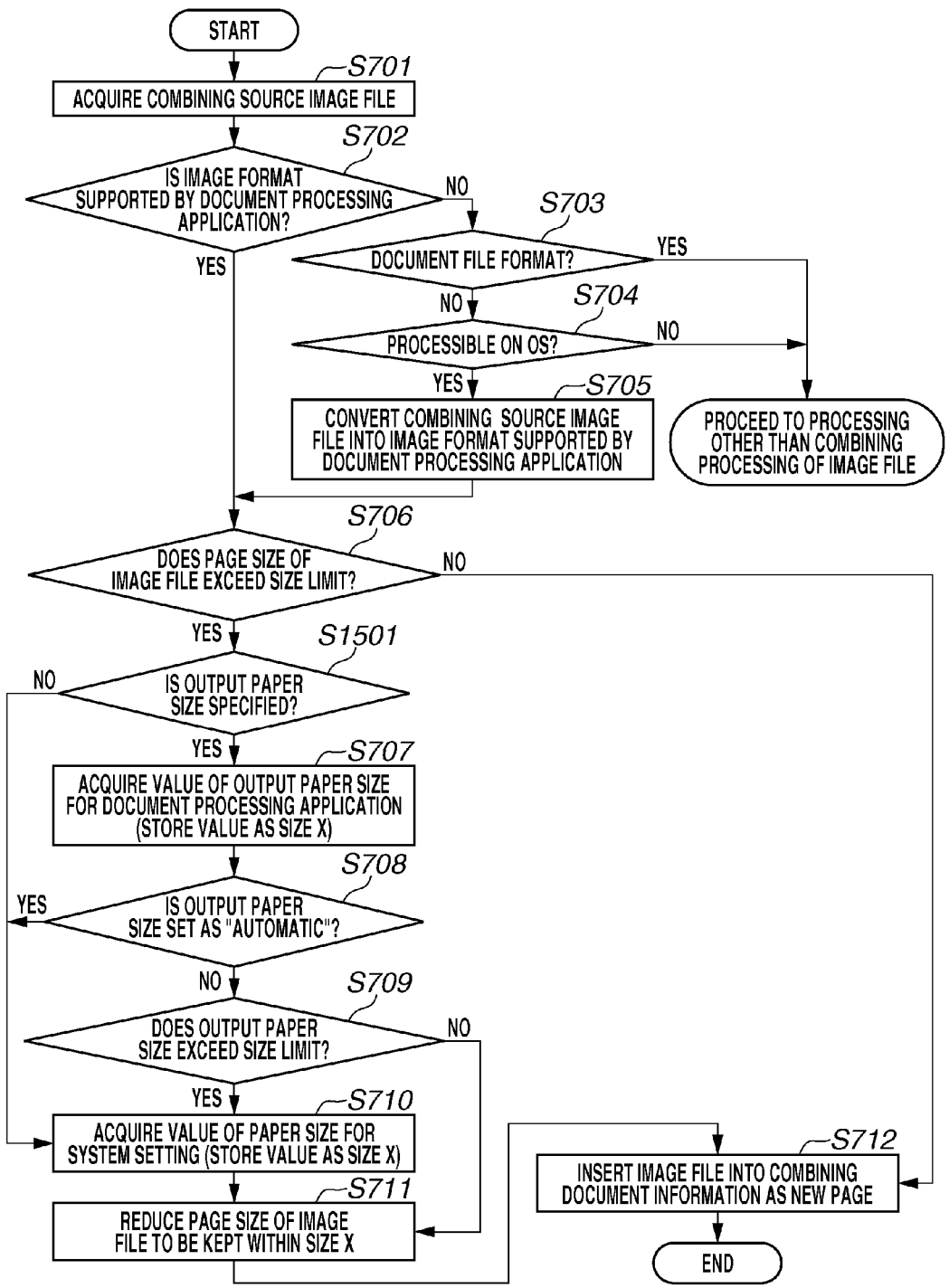
FIG. 15 is a flowchart illustrating a data processing method for the information processing apparatus.

FIG. 15 is a flowchart illustrating a data processing method of the information processing apparatus according to the present exemplary embodiment. Processing for inserting the image file into the combining document when the output paper size is not specified will be described as an example. Hereinbelow, the processing steps different from those illustrated in FIG. 8 will be described.

In step S1501, the combined document creation unit 403 decides whether the output paper size is specified. If the combined document creation unit 403 decides that the output paper size is not specified (NO in step S1501), the processing proceeds to step S710. If the combined document creation unit 403 decides that the output paper size is specified (YES in step S1501), the processing proceeds to step S707.

According to the present exemplary embodiment, even in the case where the output paper size is not specified thereto, the image file which exceeds the page size processible by the document processing application can be reduced and inserted into the combining document. Through the above-described exemplary embodiments, a large-size image file can be inserted into the combining document by reducing the size according to the paper size of the print setting, and thus it is possible to suppress lowering of the processing performance.

Embodiments of the present invention can also be realized by a computer of a system or apparatus that reads out and executes computer executable instructions recorded on a storage medium (e.g., non-transitory computer-readable storage medium) to perform the functions of one or more of the above-described embodiment(s) of the present invention, and by a method performed by the computer of the system or apparatus by, for example, reading out and executing the computer executable instructions from the storage medium to perform the functions of one or more of the above-described embodiment(s). The computer may comprise one or more of a central processing unit (CPU), micro processing unit (MPU), or other circuitry, and may include a network of separate computers or separate computer processors. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2013-099163 filed May 9, 2013, which is hereby incorporated by reference herein in its entirety.

What is claimed is:

1. An information processing apparatus comprising:
a memory storing instructions related to a document processing application; and
a processor which is capable of executing the instructions causing the information processing apparatus to:
set a size of an output paper to be used for outputting document information;
receive an insert instruction of image information to be inserted as a new page into the document information;
calculate a size of the image information from a resolution and a number of pixels;
decide whether the calculated size exceeds a size limit of a page processible by the document processing application;
execute conversion processing for reducing the size of the image information based on the set size of the output paper if it is decided that the size of the image information exceeds the size limit,
wherein the conversion processing is executed according to a paper size of a system setting if the output paper size is not specified; and
insert the image information of which size is reduced by the conversion processing into the document information as the new page of the document information.

2. The information processing apparatus according to claim 1,
wherein the document information includes a structured hierarchy.

3. The information processing apparatus according to claim 1,
wherein the instructions further cause the information processing apparatus to set an output paper size as a system setting of an application which executes document processing.

4. The information processing apparatus according to claim 3,
wherein the conversion processing is executed for reducing the size of the image information based on the output paper size set as the system setting, if the set size of the output paper is set to be an automatic setting.

5. The information processing apparatus according to claim 1,
wherein the document information includes a chapter, and the instructions further cause the information processing apparatus to determine whether an output paper size is set to a chapter that is specified based on an insert position of the image information, and
wherein the conversion processing is executed to the image information based on the output paper size set to the specified chapter, in a case where it is determined that the output paper size is set to the specified chapter.

6. A data processing method for an information processing apparatus for executing a document processing application, the data processing method comprising:
setting a size of an output paper to be used for outputting document information;
receiving an insert instruction of image information to be inserted as a new page into the document information;
calculating a size of the image information from a resolution and a number of pixels;
deciding whether the calculated size exceeds a size limit of the page processible by the document processing application;
executing conversion processing for reducing the size of the image information based on the set size of the output paper if it is decided that the size of the image information exceeds the size limit,
wherein the conversion processing is executed according to a paper size of a system setting if the output paper size is not specified; and
inserting the image information of which size is reduced by the conversion processing into the document information as the new page of the document information.

7. A non-transitory computer-readable storage medium on which is stored a computer program for making a computer execute a data processing method for an information processing apparatus for executing a document processing application, the data processing method comprising:
setting a size of an output paper to be used for outputting document information;
receiving an insert instruction of image information to be inserted as a new page into the document information;
calculating a size of the image information from a resolution and a number of pixels;
deciding whether the calculated size exceeds a size limit of the page processible by the document processing application;

executing conversion processing for reducing the size of the image information based on the set size of the output paper if the it is decided that the size of the image information exceeds the size limit,
wherein the conversion processing is executed according to a paper size of a system setting if the output paper size is not specified; and
inserting the image information of which size is reduced by the conversion processing into the document information as the new page of the document information.

* * * * *